US012663984B2

(12) United States Patent
    Deivasigamani

(10) Patent No.: US 12,663,984 B2
(45) Date of Patent: Jun. 23, 2026

(54) MEMORY PATCHING WITH ASSOCIATIVE AND DIRECTLY MAPPED PATCH DATA

(71) Applicant: Google LLC, Mountain View, CA (US)

(72) Inventor: Vinoth Kumar Deivasigamani, San Diego, CA (US)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 18/563,760

(22) PCT Filed: May 24, 2021

(86) PCT No.: PCT/US2021/033926
    § 371 (c)(1),
    (2) Date: Nov. 22, 2023

(87) PCT Pub. No.: WO2022/250653
    PCT Pub. Date: Dec. 1, 2022

(65) Prior Publication Data
    US 2024/0248709 A1     Jul. 25, 2024

(51) Int. Cl.
    *G06F 8/65*          (2018.01)
    *G06F 9/4401*        (2018.01)
    *G06F 21/57*         (2013.01)

(52) U.S. Cl.
    CPC .............. *G06F 8/66* (2013.01); *G06F 9/4403* (2013.01); *G06F 21/572* (2013.01); *G06F 21/575* (2013.01); *G06F 2221/033* (2013.01)

(58) Field of Classification Search
    CPC ........ G06F 8/66; G06F 9/4403; G06F 21/572; G06F 21/575; G06F 2221/033
    See application file for complete search history.

(56) References Cited

U.S. PATENT DOCUMENTS 5,757,690 A * 5/1998 McMahon ............. G11C 17/12
                                                 365/207
7,039,776 B2 * 5/2006 Wong ........................ G06F 8/60
                                                 711/E12.083
(Continued)

FOREIGN PATENT DOCUMENTS

TW        201222254        6/2012
TW        201222552        6/2012
(Continued)

OTHER PUBLICATIONS

"International Search Report and Written Opinion", Application No. PCT/US2021/033926, Feb. 8, 2022, 15 pages.
(Continued)

*Primary Examiner* — Jaweed A Abbaszadeh
*Assistant Examiner* — Ayman Fatima
(74) *Attorney, Agent, or Firm* — Colby Nipper PLLC

(57)                ABSTRACT

This document describes techniques and apparatuses for memory patching with associative and directly mapped patch data. In some aspects, a processor requests boot code stored at an address of a first region of an address map of a boot ROM. A boot ROM controller can determine, based on the address, that an associative record in a programmable memory includes address information matching the address. The controller returns patch data of the associative record. This patch data includes another address to a second region of the address map. The processor requests other data of the other address, which is directly mapped to other records of the programmable memory that do not include address information related to the address map. Based on an offset between the start address of the second region and the other address from which data is requested, the other data can be fetched from the directly mapped record.

20 Claims, 6 Drawing Sheets

(56)          References Cited

U.S. PATENT DOCUMENTS

| | | | |
|---|---|---|---|
| 9,471,785 | B2 | 10/2016 | Zaidi et al. |
| 2003/0159025 | A1* | 8/2003 | Dubal .................. G06F 9/4401 |
| | | | 713/1 |
| 2004/0163080 | A1 | 8/2004 | Menon et al. |
| 2004/0210720 | A1* | 10/2004 | Wong ................. G06F 12/0638 |
| | | | 711/E12.083 |
| 2014/0244991 | A1* | 8/2014 | Akdemir .............. G06F 9/4406 |
| | | | 713/2 |
| 2015/0067313 | A1 | 3/2015 | Zaidi et al. |
| 2015/0242213 | A1 | 8/2015 | Dexter et al. |

FOREIGN PATENT DOCUMENTS

| | | |
|---|---|---|
| TW | 201502990 | 1/2015 |
| TW | 201603035 | 1/2016 |
| WO | 2022250653 | 12/2022 |

OTHER PUBLICATIONS

Sherwood, et al., "Patchable Instruction ROM Architecture", Department of Computer Science and Engineering, University of California, Nov. 16, 2001, 10 pages.
"Foreign Office Action", EP Application No. 21735002.4, Aug. 28, 2024, 7 pages.
"Foreign Office Action", TW Application No. 111144277, Nov. 29, 2023, 8 pages.
"International Preliminary Report on Patentability", Application No. PCT/US2021/033926, Nov. 21, 2023, 11 pages.

* cited by examiner

100

400

402

| Header Data |
| 404 |
| Num_Type_FA [7:0] |
| 406 |

408

| Data [47:16]<br>410 | Associative Address [15:2]<br>412 | Record_EN [0]<br>414 |
|---|---|---|

416

| Data [32:1]<br>418 | Record_EN [0]<br>420 |
|---|---|

600

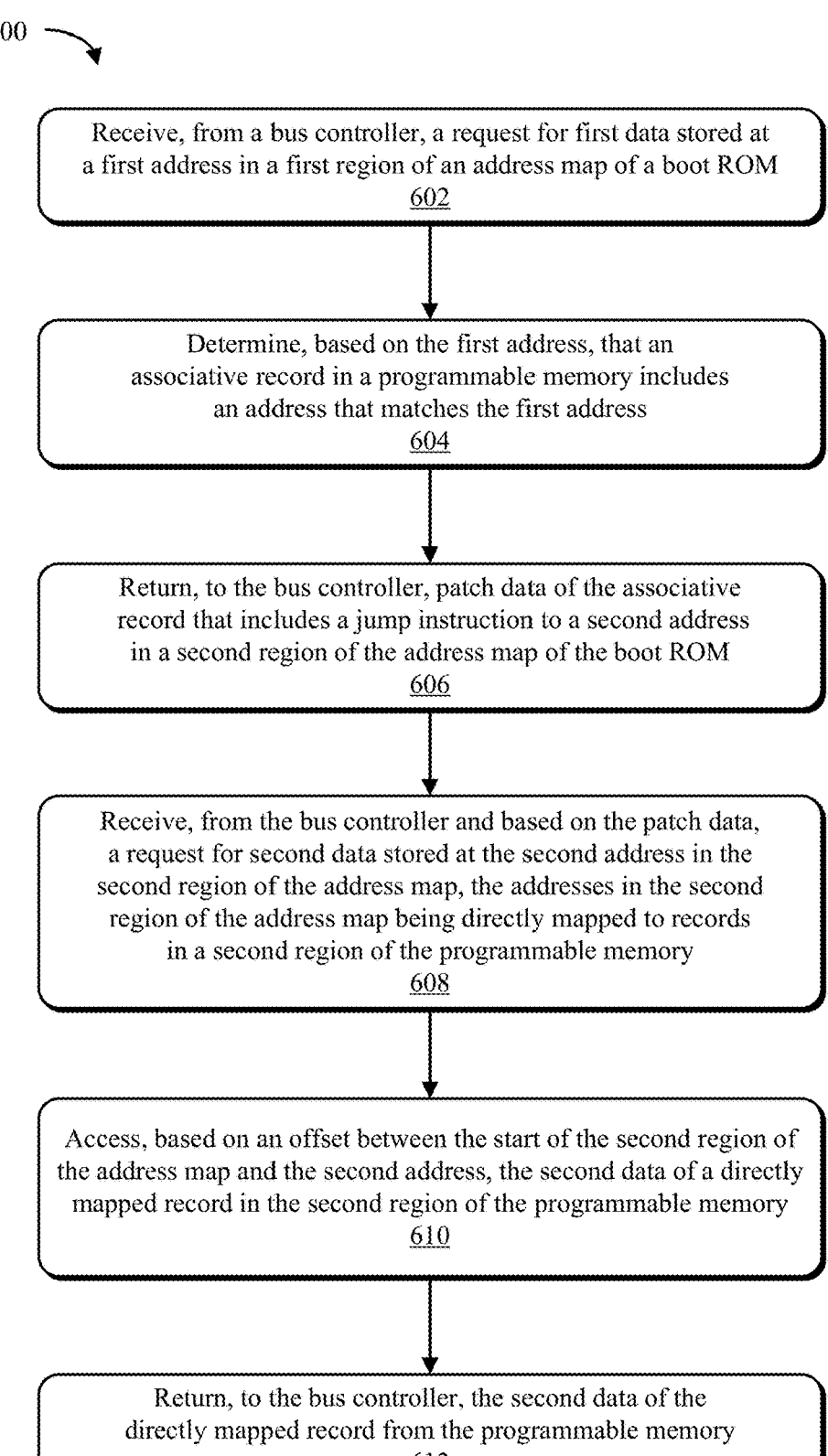

Receive, from a bus controller, a request for first data stored at
a first address in a first region of an address map of a boot ROM
602

Determine, based on the first address, that an
associative record in a programmable memory includes
an address that matches the first address
604

Return, to the bus controller, patch data of the associative
record that includes a jump instruction to a second address
in a second region of the address map of the boot ROM
606

Receive, from the bus controller and based on the patch data,
a request for second data stored at the second address in the
second region of the address map, the addresses in the second
region of the address map being directly mapped to records
in a second region of the programmable memory
608

Access, based on an offset between the start of the second region of
the address map and the second address, the second data of a directly
mapped record in the second region of the programmable memory
610

Return, to the bus controller, the second data of the
directly mapped record from the programmable memory
612

FIG. 6

MEMORY PATCHING WITH ASSOCIATIVE AND DIRECTLY MAPPED PATCH DATA

RELATED APPLICATION(S)

This application is a national stage entry of International Application No. PCT/US2021/033926, filed May 24, 2021, the disclosure of which is incorporated herein by reference in its entirety.

BACKGROUND

In a variety of digital devices, boot processes are challenged to maintain integrity and authenticity. For instance, intrusions to boot processes may enable nefarious actors to take control of a digital device, allowing access to operating systems, applications, and private data. Read-only memory (ROM) is often used to overcome integrity and authenticity concerns during startup by providing boot code, data, or instructions via hardwired, unalterable memories. Although improving security, ROM causes practical software development challenges, as changes to the ROM may not be possible after tapeout or during other device stages. This problem is often addressed by including some amount of one- or multi-time programmable memory that can be populated with patch code that is determined later, such as hardware configuration phase of the chip manufacturing cycle at the factory or test facility. Adding programmable memory to an integrated circuit or chip design, however, can be expensive and consume design space that may be useful for other components or logic.

SUMMARY

This document describes techniques for memory patching with associative and directly mapped patch data. The described techniques can enable a bus controller or boot loader to request boot code from a boot read-only memory (ROM) via a ROM controller. The boot code may be stored at an address of a first region of an address map of the boot ROM, which may map to rows of boot code stored by the ROM. The boot ROM controller can determine, based on the address, that an associative record in a programmable memory includes a matching address or address information. Based on the determination, the boot ROM controller returns patch data of the associative record to the bus controller. The patch data includes a jump instruction to another address in a second region of the address map, which may map directly to patch data records of the programmable memory. The bus controller then requests other data from the other address in the second region of the address map, which directly maps to other records of the programmable memory that do not include address information related to the address map (e.g., directly mapped records). Based on an offset between the start of the second region of the address map of the boot ROM and the other address from which data is requested, the other data (e.g., patch data or patch code) can be accessed and returned to the bus controller or boot loader.

In aspects, the directly mapped record may not use or require the associative address field for correlation with the ROM memory location, which can reduce the requisite amount of memory space for storing the associative address field and the processing time to evaluate the associative address for request ROM addresses. Thus, the described techniques and apparatuses may reduce the storage space for storing patch information within programmable memories, as well as provide other advantages. This document describes various methods, configurations, systems, apparatuses, and techniques that may enable memory patching with associative and directly mapped patch data or records for boot ROM patching or other code modification or replacement operations.

This Summary is provided to introduce simplified concepts for memory patching with associative and directly mapped patch data, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of memory patching with associative and directly mapped patch data are described in this document with reference to the following drawings. The same numbers are used throughout the drawings to reference like features and components:

FIG. 6 illustrates an example method for accessing patch data using directly mapped programmable memory in accordance with one or more implementations.

DETAILED DESCRIPTION

Overview

Figure 1:
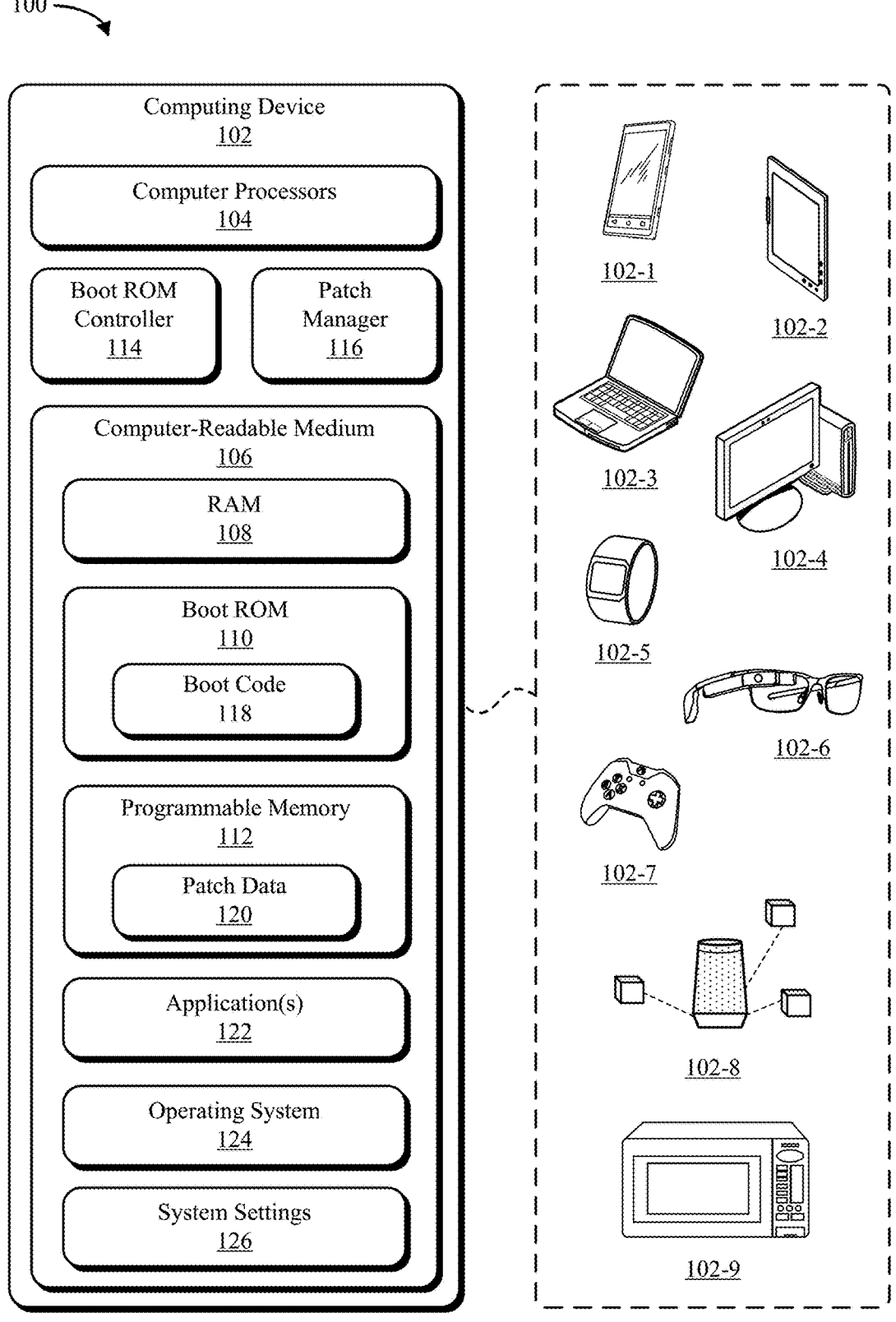
FIG. 1 illustrates an example environment in which techniques enabling directly mapped patch data for memory patching can be implemented in accordance with one or more implementations of the present disclosure.

Many computing devices include various integrated circuits, and the integrated circuits may be defined by function or operation. As examples, the integrated circuits may interface with networks, displays, communications systems, cameras, internal devices, and peripheral devices to suit users, other computing devices, and other implements. In some cases, to provide secure computing, a read-only memory (ROM) may be implemented to provide a consistent starting point for boot operations of the computing device. That is, when the computing device is powered on or reset, instructions and data within the ROM (e.g., ROM data) are loaded in sequence to initialize or "boot" subsystems of the computing device in a same or similar manner each time. This ROM code, instructions, and/or data used to boot the computing device is sometimes referred to as a boot ROM.

A ROM may be defined as a hardwired memory circuit having instructions that are unchangeable after some point in the fabrication process (e.g., tapeout, manufacture, or another step). This hardwired memory circuit may be created through lithography, etching, or other memory implements during and after fabrication. Generally, the ROM includes records, lines, rows, or memory locations identifying boot code, boot instructions, or other boot data, which may be referred to generally as boot code. As an example, the ROM may have one or more address regions or spaces with records associated with individual memory addresses. Each record may correspond to a row, location, or line of memory. At some point during fabrication or issuance, the ROM or code and data stored therein becomes locked or otherwise unalterable. Various patches, which include error corrections (e.g., bug fixes), security revisions, or other modifications, for the hard-coded ROM may be dispensed throughout the life of the computing device.

As described herein, to allow alteration of the ROM data, another memory may be disposed on the computing device to enable the replacement, deletion, omission, or insertion instructions and data as alternatives to instructions or other hard-coded ROM data (e.g., patch data). The additional memory may have limited programmability to prevent unauthorized or malicious patches to the ROM. As an example, the programmable memory may be write-once, one-time-programmable (OTP), or multiple-time programmable memory (MTP). As examples, the programmable memory may be implemented through eFuses or antifuses. Further, the programmable memory may be locked according to a lock bit or another implement that allows one or more revisions until set (e.g., OTP, MTP) to prevent subsequent modification of the patch code by unauthorized or malicious actors.

In various aspects, a programmable memory may include records or memory locations that store the patch data for the boot code. As an example, the programmable memory may have one or more address regions or address spaces with records associated with individual memory addresses. Each record may correspond to data and/or information stored in the programmable memory (e.g., at a memory location, row, or line). An address region in a memory map associated with the programmable memory may be offset or separated from an address region of the memory map that is associated with the boot ROM to allow access to unique memory records stored in either or both of the ROM and the programmable memory. In aspects, the programmable memory includes one or more regions populated with records that are fully associative with an address in the ROM (e.g., type-FA records). The type-FA records can include patch data and an address in the ROM that is related to the patch data. The programmable memory may also include one or more regions populated with records that are directly mapped to an address in an offset region of the address map (e.g., directly mapped records or type-DM records) and only implicitly associated with an address in a region of the boot map to which the ROM is mapped. The type-DM records can include patch data or instructions but, unlike a type-FA record, do not include an address (e.g., an address backed by the ROM) by which the type-DM record is accessed. To enable access of a type-DM record, an address in the offset region of the address map may be offset from a start of the offset region by a set quantity of records, addresses, rows, or lines. Additionally, the offset may include or be indexed from a start of a DM record region within the programmable memory. Accordingly, one or more offsets can be determined between a start of the offset address region of the address map and a start of the type-DM records in the programmable memory. By so doing, the directly mapped records in the programmable memory can be accessed based on a source address (e.g., in the offset region of the address map) and an offset into the programmable memory region in which the records are stored, which may be effective to enable boot code patching operations with directly mapped records of patch data of the programmable memory. This is but one example of directly mapped patch data for memory patching, others of which are provided throughout this disclosure.

By way of example, consider a boot ROM that has or is associated with a boot ROM address map with a region (e.g., an address space or map) with hexadecimally notated addresses from 0x0000_0000 to 0x0000_FFFF. Assume these addresses comprise a ROM region of the address map, with addresses that correspond to ROM entries that store records of boot code (e.g., ROM records or boot records). The boot ROM address map also includes an offset region of directly mapped addresses (e.g., a type-DM region) that starts with address 0x0001_0000 and increments up from there (e.g., 0x0001_0000, 0x0001_0001, 0x0001_0002, . . . , 0x0001_0009, 0x0001_000A, . . . , 0x0001_000F, and so forth).

In this example, a bus controller (e.g., a processor or microcontroller of a computing device) issues a request (e.g., issues a read transaction) to the boot ROM (e.g., via a ROM controller) for data stored at a ROM address between 0x0000_0000 and 0x0000_FFFF. Assume, for this example, that the request is for data at ROM address 0x0000_0008. The ROM controller issues a corresponding transaction to a programmable memory controller (e.g., a processor, microcontroller, or other logic or circuitry) over an interface between the ROM controller and controlling logic for the programmable memory. The interface may be a dedicated interface or part of another interface. In some implementations, the bus controller may send the request simultaneously to the ROM controller and the programmable memory controller (e.g., over the dedicated interface or another connection).

In this example, the programmable memory is a one-time programmable (OTP) memory and the programmable memory controller is referred to as an OTP controller. The OTP memory includes various OTP records that store patch data, which include additions or modifications to the boot records. In aspects, the OTP records include a header record (e.g., a type-H record), records that are fully associative with a ROM record (e.g., type-FA records), and other records that can be directly mapped to a ROM record (e.g., type-DM records). In aspects, the records of the OTP memory may be programmed together, with any remaining space in the OTP being burned or set to a defined state and locked via a lock bit or security register setting. The type-H record or header is the "first" record (e.g., the lowest record) in the OTP memory and indicates the number of type-FA records. The type-FA records start after the type-H record and contain an address field that includes the address or address information of the associated ROM address (or record) along with the patch data for that ROM address (or record) to be patched. The type-DM records may start after the last type-FA record and include patch data or instructions but, unlike the type-FA records, do not generally include an address field or address information from which the type-DM record is called. As described herein, the type-DM records are accessed implicitly based on a source address, an offset to a DM region of the address map, and/or an offset or index into the DM region of the OTP memory.

In response to the request from the bus controller, the ROM controller accesses the boot ROM in preparation to fetch the ROM data at the requested address (e.g., read and/or queue the ROM data to an internal cache or buffer). This is part of the operations implemented by the ROM controller and, because there may be no patch data for the requested address, the ROM controller prepares to return the data in the corresponding ROM record (e.g., to avoid latency issues). Based on the request, the OTP controller checks the type-FA records against the requested ROM address (e.g., 0x0000_0008) to determine whether any type-FA records include a matching address for patch data. If there is no type-FA record with a matching address, the OTP controller returns an indication that there is no matching address to the ROM controller (e.g., via the interface), and the ROM controller returns the boot data of the requested ROM address to the bus controller to return to the bus controller.

If there is a type-FA record with a matching address, the OTP controller returns the patch data of the type-FA record to the ROM controller (e.g., via the interface). To enable aspects of directly mapped patch data, the data of the type-FA record includes a jump instruction to an address in the type-DM region or offset region of the address map. The jump instruction can be, for example, an instruction to set or increment a program counter of the bus controller to the type-DM address that corresponds or points to the patch data or another type of instruction to request data from the type-DM address. In the context of this example, assume that the OTP controller returns a jump instruction that is a jump to type-DM address 0x0001_0002 in the offset region of the address map (e.g., offset 0x0001_from the ROM region). In response, the ROM controller returns the type-FA record data to the bus controller. Thus, instead of the boot data from the requested ROM record at 0x0000_0008, the ROM controller returns the patch data from the type-FA record with the matching associated address, which in this example is the jump instruction to type-DM address 0x0001_0002 of the offset region of the address map.

Based on the jump instruction from the patch data of the type-FA record, the bus controller issues a request or read transaction to the ROM controller for data of the address 0x0001_0002 in the type-DM address region of the address map. In response, the ROM controller issues a corresponding read transaction to the OTP controller. The OTP controller accesses the type-DM record of the OTP based on the 0x0001_0002 address (e.g., second address in the DM region of the address map) and an offset specified by the header record, which enables the OTP controller to index to a corresponding type-DM record in the OTP memory. The OTP controller then returns, to the ROM controller, the patch data from the type-DM record of the OTP memory that is directly mapped to the 0x0001_0002 address in the DM address region of the boot ROM address map. The ROM controller returns this patch data to the bus controller, which may then request a next type-DM record based on an incremented program counter. To return to the boot code, a last type-DM record of the patch data may include another jump instruction back to the ROM region of the address map to resume the boot process after the code insertion or modification enabled through the use of the type-DM records in the OTP memory.

Note, there is no associative relationship between the ROM address being patched (0x0000_0008) and the address of the type-DM record in the type-DM region of the address map (0x0001_0002). In other words, any ROM address can be patched using a jump instruction from a type-FA record to a desired type-DM region address to obtain patch data from a directly mapped type-DM record (e.g., an entry, line, or row in the OTP). As there is no ROM data backing the addresses above 0x0000_FFFF in the address map, the OTP controller returns the type-DM record data from the directly mapped OTP row. The mapping between the rows/addresses of the type-DM region of the ROM address map (e.g., those starting at 0x0001_0000) and the type-DM records in the OTP is implicit based on the type-H record and the number of type-FA records that are below the type-DM records in the OTP. Thus, the type-DM records may include patch code without requiring associative address information, which enables more-efficient use of the OTP memory to store patch code or an OTP memory to store more patch code relative preceding patching techniques that rely solely on associative records for patch operations.

In aspects, the implicit addressing of the type-DM records may be implemented as follows. Based on the type-H record and the source address of the transaction in the ROM address space (e.g., 0x0001_0002), the OTP controller can determine which line of patch data should be returned. First, there is one type-H record, which indicates the number of type-FA records present in the OTP memory. Second, the requested type-DM address describes (e.g., by index) which type-DM record includes the requested patch data. For example, the address 0x0001_0002 indicates that the data of the third type-DM record is requested (the "02" record is third after "00" and "01"). For this example, assume that the type-H record indicates that there are fifteen type-FA records populated or burned into the OTP memory. Therefore, the requested data is to be accessed from the nineteenth type-DM record in the OTP memory based on a sum of a count of the one type-H record, fifteen type-FA records, and three type-DM records. Accordingly, using a type-FA record jump instruction, any line or lines of ROM code at an address in a boot region of the ROM address map (e.g., a lower 64 KB region) can be patched by using a type-FA record to jump to an address of a directly mapped type-DM record in the type-DM region of the address map (e.g., at or above 0x0001_0000). As noted, after the bus controller receives the patch data from the type-DM record that is directly mapped to the 0x0001_0002 address, the bus controller continues to request data from the next incremented DM addresses (e.g., 0x0001_0003, 0x0001_0004, and so forth) until the returned patch data includes a jump instruction or address that directs the bus controller's requests back into the ROM address space (e.g., below 0x0001_0000).

In contrast to the described aspects, many preceding methods for patching boot ROM rely exclusively on type-FA records, which can increase boot time because each address in the ROM (e.g., each record, row, or line of boot code) must be checked against each type-FA record for patch instructions or data to determine whether there is a type-FA record with patch data for that ROM address. Additionally, this means that for every type-FA record, at least the address field must be read, which can consume time and processing/compute resources. Further, type-FA records must also occupy enough physical memory space to include both the associative address field for correlation with the ROM memory location and the related patch data.

Thus, the described aspects, which implement type-DM records that do not include an address field for correlation with a ROM memory location or other associative address information, enable more-efficient boot operations and improved utilization of programmable memory capacity. In other words, type-DM records used to patch multiple lines of boot code often take up relatively less memory space than the type-FA records. Additionally, processing time to access type-DM records can be reduced because there is no address or address information in the type-DM records to read or evaluate, particularly once patching via type-DM records is initiated. This can be particularly advantageous in a case in which the patch includes an insertion of many sequential lines of patch data into or in place of boot code. In such cases, which is a common mode of patching, only one type-FA record is read, even if several lines of patch data are inserted (one to jump to the type-DM address region and a last type-DM record includes a jump back to the ROM address region). Thus, in an example in which 12 lines of patch data are inserted into the boot code, only one type-FA record needs to be populated and read, rather than 12 separate type-FA records, which saves space and reduces the patch time and resource consumption of the boot ROM system of a chip or system. These are but a few examples of directly mapped patch data for memory patching, others of which are described throughout this disclosure in the context of various apparatuses, systems, components, and/or methods.

Example Apparatuses, Systems, and Components

FIG. 1 illustrates an example environment 100 in which techniques enabling memory patching with associative and directly mapped patch data can be implemented in accordance with one or more aspects of the present disclosure. An example computing device 102 or components therein may be provided according to various manufacturing and/or assembly processes that include the incorporation of a read-only memory and programmable memory as described herein. The example computing device 102 is illustrated with a variety of example devices, including a smartphone 102-1, a tablet 102-2, a laptop 102-3, a desktop computer (e.g., a computing device) 102-4, a computing watch 102-5, computing spectacles 102-6, a gaming system 102-7, a home automation and control system 102-8, and a smart-appliance 102-9. Although not shown, the computing device 102 can also be implemented as other types of devices, e.g., a television, set-top box, entertainment system, audio system, an automotive computer, drone, netbook, e-reader, home security system, another home appliance, and other internet-of-things device. Note that a computing device 102 can be mobile, wearable, non-wearable but mobile, or relatively immobile (e.g., desktops appliances and servers in data centers). Thus, any suitable type of computing device with a read-only memory and programmable memory is contemplated in the aspects described throughout this disclosure.

As shown in FIG. 1, the example computing device 102 may also include one or more processors (or computer processors) 104. The processors 104 may be implemented as any suitable type or configuration of processor and may be associated with a computer-readable medium (CRM) 106. In this example, the computer-readable medium 106 includes random-access memory 108 (RAM 108), a read-only memory (ROM) implemented as a boot ROM 110, and a programmable memory 112. The computing device 102 also includes a boot ROM controller 114 and a patch data manager 116 (patch manager 116) to manage operation and functionalities of the boot ROM 110 and/or the programmable memory 112. Generally, the boot ROM controller 114 may be associated with the boot ROM 110 of the computer-readable medium 106, and the patch manager 116 may be associated with the programmable memory 112. The boot ROM 110 may be implemented as hardwired memory circuitry or cells (e.g., memory circuits, memory chips, memory arrays, and/or memory address spaces) having hardcoded instructions or data stored therein that are unchangeable after tapeout, fabrication, manufacture, programming, or another life cycle period of the computing device. The hardwired memory circuits, components, and other features of the boot ROM 110 may be created through lithography, etching, or other memory implements during fabrication of an integrated-circuit substrate on which the boot ROM 110 is formed.

In aspects, the boot ROM 110 of the computing device 102 includes boot code 118, which may be utilized during a boot process of the computing device 102. The boot code 118 can include code, records, entries, instructions, or data that are used to boot or initialize the computing device 102 or subsystems thereof. The boot code 118 may also or instead include memory locations storing boot code, boot instructions, boot data, or the like. As an example, contents of the boot ROM 110 may be addressable or accessed through an address space (e.g., a memory map or address region) with records, rows, or lines of boot code associated with individual memory addresses. Each address may correspond to one or more memory locations or records within the boot ROM 110. At some point during fabrication or manufacture, the contents of the boot ROM 110 can be hardcoded, programmed, burned, or otherwise made unalterable. As such, implementing changes or patches for error corrections (e.g., bug fixes), security revisions, or other modifications to the contents of the boot ROM 110 may be implemented after fabrication of the boot ROM 110 using patch data 120 of the programmable memory 112. For example, the boot ROM 110 may be patched during assembly, programming, or provisioning of a printed circuit board or computing device in which the boot ROM 110 is implemented (e.g., as part of a system-on-chip).

In aspects, the patch data 120 is written or stored to the programmable memory 112 and may include patch data or patch code configured as an update or revision to the boot code 118. The patch data 120 may be written to the programmable memory 112 through various implementations, which may include setting fuse values or burning fuses to set respective values of bits or lines of the patch data 120. As an example, the programmable memory 112 may be a write-once or one-time-programmable (OTP) memory or a multi-time programmable (MTP) memory that is programmed through eFuses or antifuses (fuse programming logic not shown). Generally, the patch data 120 may be written to the programmable memory 112 at various times during the life of the computing device 102 (e.g., during a test phase, evaluation phase, or programming phase). Other mechanisms and implements may be used to limit revisions to the contents of the programmable memory 112. As an example, the programmable memory 112 may be associated with a control bit that, once set, locks the programmable memory 112 from further alteration. As such, the patch data 120 can be written to the programmable memory 112 to allow the patch manager 116 or another implement to apply the patch data 120 stored therein without the risk of subsequent alteration of the patch data 120 by unauthorized or malicious actors. Each of the processors 104, the boot ROM controller 114, and the patch manager 116 may be implemented as a respective combination of circuitry, memory, and logic, all of which may include processors and other processing circuitry or interface logic to access the programmable memory 112, the boot ROM 110, the boot code 118, the patch data 120, and/or the computer-readable medium 106 in accordance with various aspects.

The computing device 102 may also include applications 122 and/or an operating system 124 implemented as computer-readable instructions on the computer-readable medium 106 that can be executed by the computer processors 104. Although not shown, some implementations of the computing device 102 can include a network interface for communicating data over wired, wireless, or optical networks. By way of example and not limitation, the network interface of a computing device 102 may enable communication of data over a local-area-network (LAN), a wireless local-area-network (WLAN), a personal-area-network (PAN), a wide-area-network (WAN), an intranet, the Internet, a peer-to-peer network, point-to-point network, or a mesh network.

In other implementations (not shown), some or all of the components of the computing device 102 may be implemented as a System-on-Chip (SoC), one or more Integrated Circuits (ICs), a printed circuit board assembly, hardware with embedded firmware, or any combination thereof. Processor-executable instructions stored on the CRM 106 may include the applications 122, the operating system 124, and/or system settings 126, which can be executed by the processor 104 or other hardware-based processor to provide functionalities of the computing device 102 and/or operations associated with aspects of directly mapped patch data for memory patching. In other words, the processors 104, boot ROM controller 114, and/or the patch manager 116 may execute the instructions to implement a combination of operations and executions as provided in this disclosure.

Figure 2:
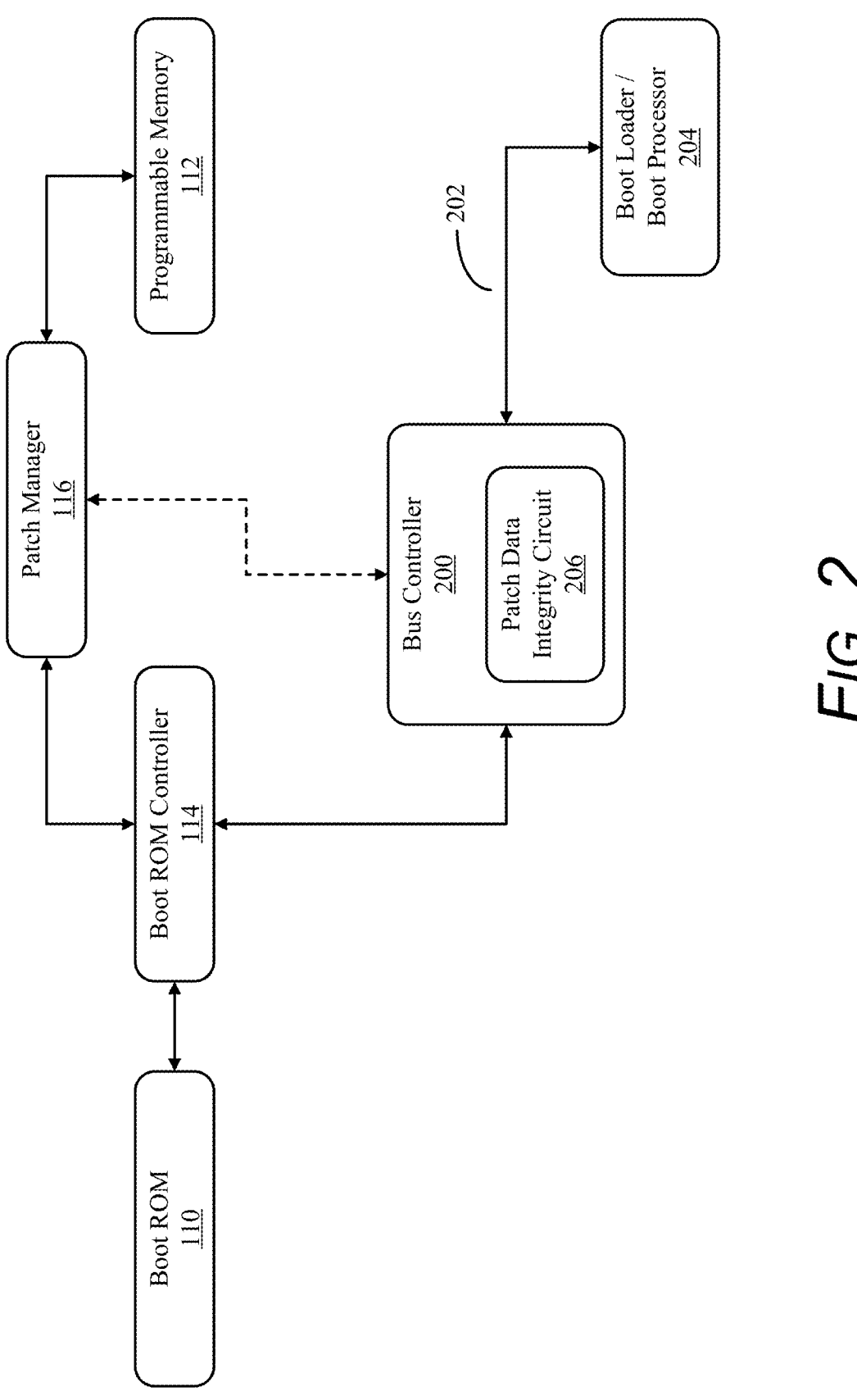
FIG. 2 illustrates an example configuration of a patch manager and programmable memory in accordance with one or more implementations of the present disclosure.

FIG. 2 illustrates an example configuration of a patch manager 116 and a bus controller 200 in accordance with one or more aspects of the present disclosure. As part of a boot process, the bus controller 200 or a boot loader 204 of a computing device may request, from the boot ROM controller 114, ROM data stored within the boot ROM 110 (e.g., the boot code 118) at a particular ROM address. Various requests and responses exchanged between the entities of FIG. 2 may be implemented through various signals and communications defined by protocols or communication standards pertaining to the computing device 102 and circuitry disposed therein. After receiving the request, the boot ROM controller 114 may query the boot ROM 110 for the boot code (or other boot instructions or boot data) located at the ROM address. The boot ROM controller 114 may also send a request to the patch manager 116 to query the programmable memory 112 for patch data stored therein (e.g., the patch data 120) that corresponds to the requested address. As an example, the patch manager 116 may query the programmable memory 112 for records based on the ROM address to determine whether patch data is present or configured for the given ROM address.

Based on the presence of patch data for the requested address, the boot ROM controller 114 may be configured or have circuitry to send the ROM data, or the patch data when present, to the bus controller 200. The bus controller 200 may send the boot instructions and other data on a bus 202 for processing by integrated circuits, processors, and other components to perform boot operations based on the boot code and patch data. For example, the bus controller 200 may transmit the boot code 118 or patch data 120 to the boot loader 204 (or a boot processor), which in turn implemented operations to boot the computing device 102. In some implementations, the bus controller 200 may include a patch data integrity circuit 206 that includes registers, gates, and/or other components to ensure integrity of the boot instructions and data. As an example, the boot instructions and data received from the boot ROM controller 114 may be complemented or inverted and then stored by the various components of the patch data integrity circuit 206. The boot instructions (e.g., the boot code 118 or the patch data 120), data, inversions, or complements thereof can then be checked and verified (e.g., to prevent attempts to load malicious code or side-channel attacks) before being sent along the bus 202 to the downstream processors, integrated circuits, and other components (e.g., to the boot loader 204 or a boot processor) to initialize the computing device 102.

The bus controller 200, the boot ROM controller 114, and the patch manager 116 are depicted as distinct circuitries associated with respective boot ROM 110, programmable memory 112, and bus 202. In some aspects, the bus controller 200, the boot ROM controller 114, and the patch manager 116 are implemented as respective IP blocks associated with the boot ROM, programable memory, and/or a fabric or interconnect (e.g., bus) coupling the various components of the computing device 102 to enable various communication and operations described herein. The bus controller 200, the boot ROM controller 114, and the patch manager 116 may be integrated or segmented as a unitary entity or various quantities of entities. Communication between the bus controller 200, the boot ROM controller 114, and the patch manager 116 may be internal or external and use open-source or proprietary protocols. For example, the boot ROM controller 114 and the patch manager 116 may communicate via a dedicated interface or over a part of an interface or bus connecting the bus controller 200 and the boot ROM controller 114. The bus controller 200, the boot ROM controller 114, and the patch manager 116 may be located within or outside of the computer-readable medium 106. As an example, the computer-readable medium 106 may include integrated circuitry for providing data to the processors 104 or other components of the computing device 102. As another example, the boot ROM controller 114, the bus controller 200, and the patch manager 116 may be distinct from the computer-readable medium 106. As a further example, the boot ROM controller 114, the bus controller 200, and the patch manager 116 may include hardware interrupts that scan addresses or receive data from the computer-readable medium 106.

In aspects, the bus controller 200, a boot loader, or processor may operate according to a sequence of steps or instructions based on processor-executable instructions stored within the computer-readable medium 106. For instance, the sequence of steps may include reading from the computer-readable medium 106 an address map of the boot ROM 110 (e.g., an address space or region) that contains the boot instructions and other data (e.g., the boot code 118). The combination of steps may also include generating transaction requests for each address or particular addresses in the address space to the boot ROM controller 114 for retrieval. The bus controller 200 may then execute or use the instructions or data received from the boot ROM 110 or programmable memory 112 to implement boot operations or other functionalities of the computing device 102.

The boot ROM controller 114 may also operate according to a combination of steps or instructions. The combination of steps or instructions may be stored within the computer-readable medium 106 as processor-executable instructions, defined within associated circuitry, or otherwise provided. For instance, the boot ROM controller 114 may receive, from the bus controller 200, a request for first data stored at a first address in a first region of the address map of the boot ROM 110. The boot ROM controller 114 may then return to the bus controller 200, based on a determination that an associative record in a first region of the programmable memory 112 includes an address that matches the first address, the patch data 120 of the associative record. In some cases, the determination of the address match is based on the first address and an associative address of the associative record. The boot ROM controller 114 may query the programmable memory 112 directly or indirectly (e.g., through the patch manager 116). When there is a matching associative record in the first region of the programmable memory 112, the boot ROM controller 114 returns the patch data 120 to the bus controller 200.

In aspects, the patch data 120 of the associative record may include a jump instruction to a second address in a second region of the address map of the boot ROM. When the patch data 120 includes a jump instruction, the bus controller 200 processes or executes the jump instruction and sends a request for the patch data at the specified jump address. Accordingly, the boot ROM controller 114 may then receive from the bus controller 200 and, based on the patch data 120, a request for second data stored at a second address in a second region of the address map. The addresses in the second region of the address map can be directly mapped to records in a second region of the programmable memory 112. Thus, the data stored at the second addresses in the second region of the boot ROM address map is not stored in the boot ROM 110 but in the programmable memory 112. The boot ROM controller 114 may then receive the second data from the patch manager 116 (e.g., in response to the boot ROM controller 114 forwarding the request for the second data to the patch manager 116). In some implementations, the boot ROM controller 114 or the bus controller 200 may request the second data directly from the programmable memory 112 or the patch manager 116. The patch manager 116 can be configured to access the second data based on an offset between the start of the second region of the address map and the second address. The boot ROM controller 114 can then return to the bus controller 200 the second data of the directly mapped record of the programmable memory 112.

Consider the following example of an offset determination. As described, the programmable memory 112 can include records that store patch data 120. These records include a header record (e.g., a type-H record), records that are fully associative with a ROM record (e.g., type-FA records), and other records that can be directly mapped to a ROM record (e.g., type-DM records). Thus, the type-FA records can correspond to the associative records in the first region of the programmable memory 112. Similarly, the type-DM records can correspond to the directly mapped records positioned in the second region of the programmable memory 112. Further, the type-H record may be placed or positioned as the "first" record (e.g., the lowest record) in the programmable memory 112 and include a value that describes the quantity of associative records stored in the programmable memory 112 (e.g., the number of type-FA records in the programmable memory 112). As described herein, the type-FA records can start after the type-H record and contain an address field that includes the address or address information of the associated ROM record along with the patch data for that ROM record. The type-DM records start after the last type-FA record and include patch data or instructions, but do not include an address, address field, or address information.

In aspects, the data of the type-FA record can include a jump instruction to an address in the second region of the address map (e.g., a type-DM region). The jump instruction can be, for example, an instruction to set or increment a program counter of the bus controller 200 or boot loader to the type-DM address that contains the patch data 120. The address in the jump instruction may include an index or other means of identifying which address to request. For example, assume that the jump instruction is a jump to type-DM address notated hexadecimally as 0x0001_000N. Based on the jump instruction from the data of the type-FA record, the bus controller 200 issues a request or read transaction to the boot ROM controller 114 for data of the address 0x0001_000N in the type-DM address region of the ROM address map. In response, the boot ROM controller 114 can issue a corresponding read transaction to the patch manager 116. The patch manager 116 can return to the ROM controller the patch data 120 from the type-DM record of the programmable memory 112 that is directly mapped to the 0x0001_000N address in the DM address region of the boot ROM address map. The boot ROM controller 114 can then return the patch data 120 to the bus controller 200.

The offset (e.g., mapping) between the rows/addresses of the type-DM region of the ROM address map (e.g., those starting at 0x0001_0000) and the type-DM records in the programmable memory 112 is implicit and may be based on the type-H record, a quantity of type-FA records that are below the type-DM records in the programmable memory 112, and the address of the type-DM record in the jump instruction. For example, based on the type-H record and the source address of the requested type-DM record (e.g., 0x0001_000N), the patch manager 116 can determine the patch data 120 that should be returned. First, assume for this example that there is one type-H record and the type-H record includes the quantity of type-FA records stored in the programmable memory 112. Second, the requested type-DM address describes which type-DM record includes the requested patch data. For example, the address 0x0001_000N indicates that the data of the Nth type-DM record is requested (e.g., if N is "2," then the data of the third type-DM record is requested because the "2" record is third after "0" and "1"). In this example, assume that the type-H record indicates that there are fifteen type-FA records (and that N=2). Therefore, the requested data is in the nineteenth record in the programmable memory 112, counting one type-H record, fifteen type-FA records, and three type-DM records. Accordingly, using a type-FA record jump instruction, any line or lines of ROM code at an address in a boot region of the ROM address map (e.g., a lower 64 KB region) can be patched by using a type-FA record to jump to an address of a directly mapped type-DM record in the type-DM region of the address space (e.g., at or above 0x0001_0000).

The patch manager 116 may also operate according to a combination of steps or instructions. The combination of steps or instructions may be stored within the computer-readable medium 106, defined within associated circuitry, or otherwise provided. For instance, the combination of steps may include receiving an address from the boot ROM controller 114, the bus controller 200, or another implement. The address may be compared with addresses and information within the programmable memory 112 as discussed herein. If a match is found, the relevant patch data is provided by the patch manager 116 to the boot ROM controller 114, the bus controller 200, or another implement.

Figure 3:
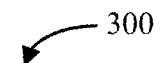
FIG. 3 illustrates an example communication interface for a patch manager in accordance with one or more implementations of the present disclosure.
Figure 3:
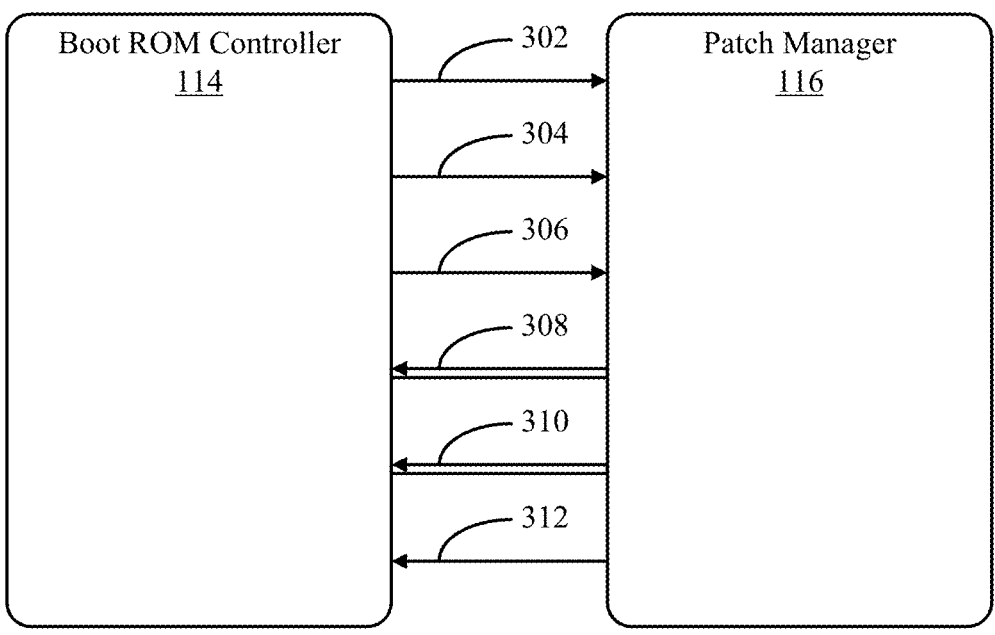

FIG. 3 illustrates example communication paths 300 in accordance with one or more implementations of the present disclosure. As shown, the boot ROM controller 114 may interface with the patch manager 116 over communication paths 300 (e.g., as a communicative interface between ROM and OTP IP blocks). As mentioned herein, the communication paths 300 may be internal or external to components interfacing with the boot ROM 110 and the programmable memory 112. In some implementations, the communication paths 300 include a dedicated interface. For example, type indicator 302 may indicate the type of record sought by the boot ROM controller 114 of the patch manager 116. For instance, a TRUE value (e.g., a "1") may indicate that an associative record (e.g., a type-FA record) is sought, while a FALSE value (e.g., a "0") may indicate that a directly mapped record (e.g., a type-DM record) is sought. An address bus 304 may communicate designations associated with requests. As an example, the address bus 304 may communicate the boot ROM address requested by the bus controller 200. The address bus 304 may also provide an index of the requested directly mapped record. As an example, a lookup table may be stored on the boot ROM controller 114 or the patch manager 116 associating memory addresses and indices used to locate the directly mapped records within the programmable memory (e.g., the programmable memory 112). The boot ROM controller 114 may send a request valid indication 306 to the patch manager 116 to indicate the information provided is complete and ready for consumption to fulfill the request. As an example, the patch manager 116 may receive a TRUE indication from the type indicator 302 and a boot ROM address over the address bus 304. After transmission is complete, the request valid indication 306 becomes TRUE, indicating the patch manager 116 should use the information stored in registers therein to fulfill the request.

The patch manager 116 may send a response valid indication 308 back to the boot ROM controller 114 to indicate that the information read and returned is complete, allowing the boot ROM controller 114 to act upon the information stored in buffers therein. The patch manager 116 may communicate the patch data read from the programmable memory 112 to the boot ROM controller 114 over the read data bus 310. The read data bus 310 may be sized to communicate the patch data in parallel or chunks. As an example, the read data bus 310 may be a 32-bit bus. An error indication 312 may be provided from the patch manager 116 to indicate that patch data was not available at the given memory location or other errors associated with the programmable memory 112.

Figure 4:
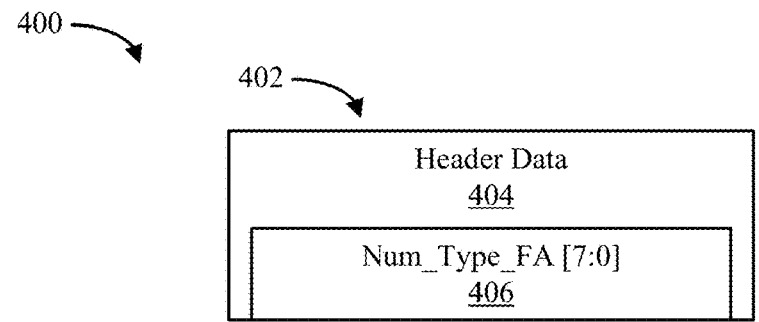
FIG. 4 illustrates example diagrams of records and record data structures in accordance with one or more implementations of the present disclosure.
Figure 4:
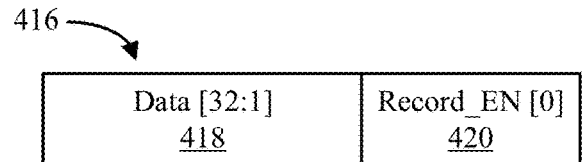

Consider FIG. 4, which illustrates example record data structures 400 of the programmable memory 112 in accordance with one or more implementations of the present disclosure. A type-H header record 402 may be associated with a memory address (e.g., a header record address) that is a programmable memory address or a first or base line of the programmable memory 112. The header record address may begin at the start of the programmable memory address space (e.g., at the first address). The header record 402 may include header data 404, which may indicate one or more bytes of information (e.g., eight bits) that indicate a number of type-FA records present in the programable memory. As an example, the header record 402 may be associated with one byte of header data 404 that begins at the start of the programmable memory address space and indicates a "Num_Type FA" 406 or number of type-FA records with eight bits [0:7] of information.

One or more type-FA records (fully associative records) 408 of the programmable memory may include fields for data 410 (e.g., patch data, bits [47-16]), an associative address 412 (e.g., bits [15:2]), and/or a record enable bit 414 (e.g., bit [0]), which may be used to indicate whether the FA-type record is enabled. Thus, the type-FA record 408 may be associated with respective memory addresses (e.g., associative record memory addresses) in the address map by the associative address 412, which may be programmable per type-FA record. The associative address 412 may correspond or have equal, equivalent, or similar values to ROM memory addresses (e.g., addresses of boot records for the boot code 118), indicating that the data 410 (e.g., at least a portion of the patch data 120), exists for the corresponding ROM memory addresses associated with the boot code 118.

As such, the boot ROM controller 114 may receive a requested memory address from the bus controller 200. The boot ROM controller 114 may send the request to the patch manager 116 with the memory address for comparison with the associative address 412. The patch manager 116 may query the associative addresses 412 in various orders or sequentially, comparing the memory address received over the address bus 304 to the associative addresses 412 stored within the programmable memory 112. As such, the data 410 may be recognized and read from the type-FA record 408 of the programmable memory 112 based on the associative addresses 412 that are corresponding, equal, equivalent, or similar to the memory address provided and sent over the read data bus 310 to the boot ROM controller 114.

One or more type-DM records (directly mapped records) 416 may include a field for data 418 and an enable bit 420, which may be used to indicate whether the DM-type record is enabled. Generally, the type-DM records of the programmable memory are directly mapped to or associated with respective memory addresses in an offset or second region of the address map of the boot ROM. The type-DM records are stored in the programmable memory after or above the header record and the type-FA records such that an implicit mapping to the type-DM records can be implemented based on an index or count from a last of the type-FA records or a beginning (or start) of the type-DM region of the programmable memory. In one example, the directly mapped records 416 may fill the remainder of the addresses of the programmable memory 112. Patch data (e.g., at least a portion of the patch data 120) may be stored within the field for data 418 of the directly mapped records 416, which may be retrieved via a request to an address in the offset region of the address map to which a respective type-DM record is mapped. The designations depicted in FIG. 4 relate to example fields associated with the particular record types. How the various types of records are implemented and used varies and is described throughout this disclosure.

Figure 5:
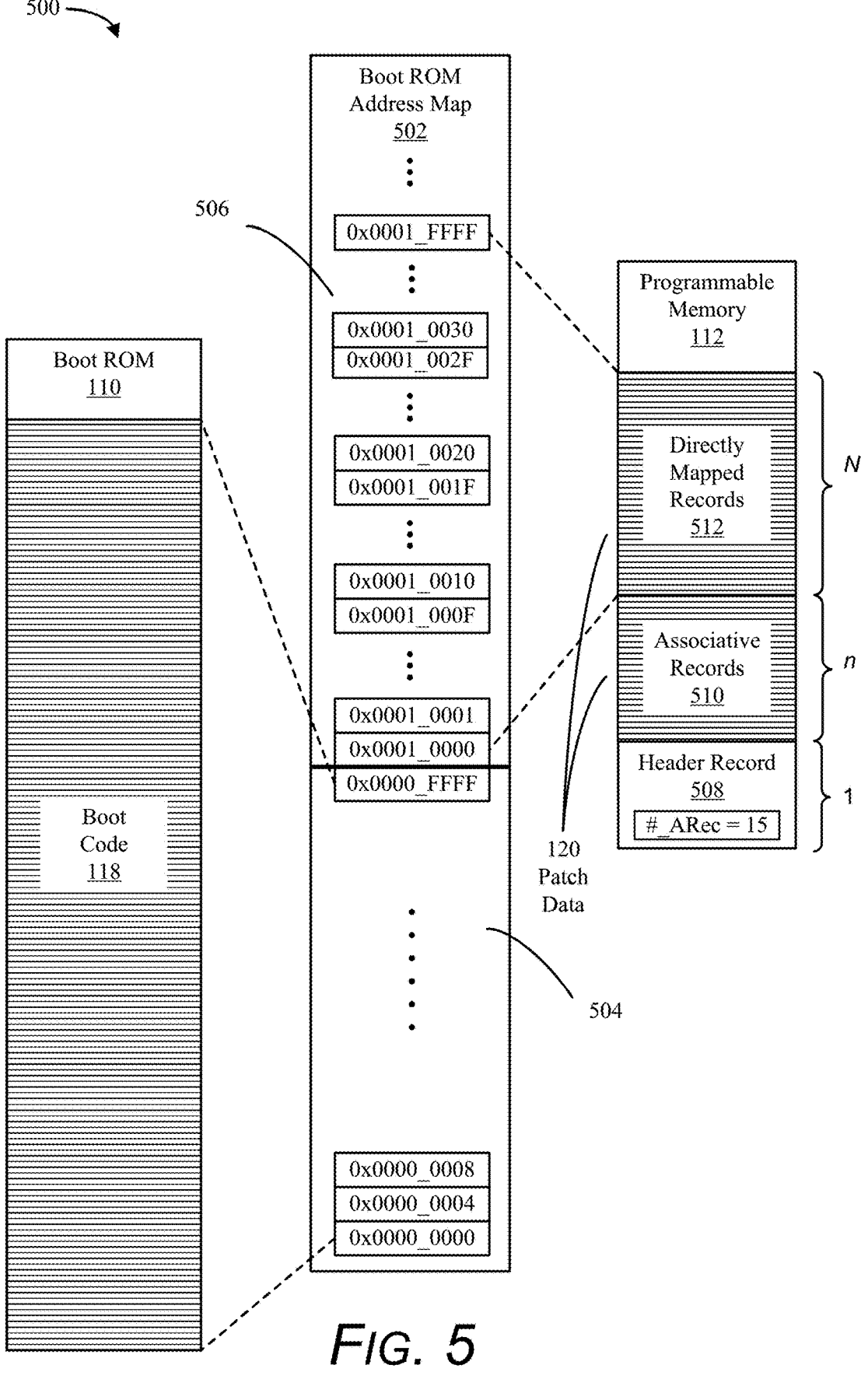
FIG. 5 illustrates an example address map in accordance with one or more implementations of the present disclosure.

FIG. 5 illustrates, at 500, an example boot ROM address map 502 in accordance with one or more implementations of the present disclosure. Data stored for memory addresses of the example boot ROM address map 502 may occupy memory locations of the boot ROM 110 and/or the programmable memory 112. As shown in FIG. 5, the example boot ROM address map 502 includes a ROM region 504 with memory addresses that are hexadecimally notated addresses that can start at 0x0000_0000 and can increment up to 0x0000_FFFF. The addresses of the ROM region 504 can map to corresponding lines of the boot ROM 110 that store the boot code 118. The example boot ROM address map 502 also includes a type-DM region 506 with addresses directly mapping to the type-DM records starting with address 0x0001_0000 and increment up from there (e.g., up to 0x0001_FFFF). In other words, the addresses of the type-DM region 506 can map directly to lines or rows of the programmable memory that store records of the patch data 120.

In some implementations, the boot ROM address map may be electronically accessible by one or more of the boot ROM controller 114, the boot ROM 110, the patch manager 116, or the programmable memory 112. Accordingly, the bus controller 200 (or another component) can issue requests to the boot ROM 110 (e.g., via the boot ROM controller 114) for a ROM record of the boot code 118, including data stored at a ROM address between 0x0000_0000 and 0x0000_FFFF. The boot ROM controller 114 can issue a corresponding request to the patch manager 116 over an interface (e.g., a dedicated interface). In some implementations, the bus controller 200 may send the request simultaneously to the boot ROM controller 114 and the patch manager 116.

As described with reference to FIG. 1, the programmable memory 112 includes records that store the patch data 120. The records of the programmable memory 112 include at least one header record 508 (e.g., the type-H header record 402), associative records 510, and directly mapped records 512. As shown in FIG. 5, the programmable memory 112 includes one header record 508, n associative records 510, and N directly mapped records 512. The associative records 510 are records that are fully associative with a ROM record (e.g., the type-FA records 408). The directly mapped records 512 are records that can be directly mapped to a ROM record (e.g., the type-DM records 416). The header record 508 includes the number of associative records 510. The associative records 510 start after the header record 508 and contain a field that includes address information of the associated ROM record along with the patch data 120 for that ROM record. The directly mapped records 512 start after the last type-FA record and include patch data or instructions (e.g., a jump instruction) but no address field or address information.

In response to the request from the bus controller 200, the patch manager 116 checks the associative records 510 against the requested ROM address to determine whether any associative records 510 include a matching address. If there is no associative record 510 with a matching address, the patch manager 116 returns to the boot ROM controller 114 an indication that there is no matching address, and the boot ROM controller 114 returns the data of the requested ROM address to the bus controller 200. If there is an associative record 510 with a matching address, the patch manager 116 returns the data of the associative record 510 to the boot ROM controller 114. The data of the type-FA record can include a jump instruction to an address in the type-DM region 506 of the address map. The jump instruction can be, for example, an instruction to set or increment a program counter of the bus controller 200 to the directly mapped record or records 512 that contain the patch data 120 (or another type of instruction to request data from the directly mapped records 512). Thus, instead of the boot code 118 data from the requested ROM record, the boot ROM controller 114 returns the patch data from the associative record 510 having the matching associated address (e.g., the jump instruction to a directly mapped record 512).

In some implementations, during the programming of the programmable memory 112, the patch data 120 comprises one or more sections in which more than one sequential row of the patch data 120 is to be inserted (e.g., added to or in replacement of the boot code 118). In this case, a respective associative record 510 can be populated with a first ROM address (e.g., the point of insertion or addition) along with a jump instruction to an address in the type-DM region 506 that is mapped to the first directly mapped record 512 of the sequence.

Based on the jump instruction, the bus controller 200 can issue a request to the boot ROM controller 114 for data of the address in the type-DM region 506 that was returned as the patch data 120. The patch manager 116 can then return to the boot ROM controller 114 the patch data 120 from the directly mapped record 512. The ROM controller returns the patch data 120 to the bus controller. Note that there is no associative relationship between the ROM address being patched and the address of the directly mapped record 512 in the type-DM region 506. Instead, the mapping between the rows/addresses of the type-DM region 506 of the ROM address map 502 and the directly mapped records 512 in the programmable memory 112 is implicit based on the header record 508 and the number of associative records 510 that are below the directly mapped records 512 in the programmable memory 112. Consequently, any ROM address can be patched using a type-FA record to jump to a desired type-DM region address to obtain patch data 120 from a directly mapped record in the programmable memory 112.

For example, based on the header record 508 and the source address of the transaction in the ROM address space (e.g., the jump instruction), the patch manager 116 can determine the patch data 120 that should be returned. First, as shown in FIG. 1, there is one header record 508 and the header record 508 includes the number of associative records 510, shown as "#_ARec" in FIG. 5. Second, the requested address (e.g., the jump instruction) describes which directly mapped record 512 includes the requested patch data. In some cases, the requested address can indicate the first of at least two sequential directly mapped records 512. For example, the address 0x0001_0002 indicates that the data of the third directly mapped record 512 is requested (the "02" record is third after "00" and "01"). For this example, assume that the header record 508 indicates that there are fifteen associative records 510 (e.g., #_ARec=15). Therefore, the requested data is in the nineteenth record of the programmable memory 112, counting one header record 508, fifteen associative records 510, and three directly mapped records 512. Accordingly, using a jump instruction from an associative record 510, any line or lines of boot code 118 at an address in a boot region of the ROM address map (e.g., a lower 64 KB region) can be patched by using the jump instruction to jump to an address in the type-DM region 506 of the address map 502 space (e.g., at or above 0x0001_0000), which is directly mapped to a record in the programmable memory 112.

After the bus controller 200 receives the patch data 120 from the directly mapped record 512, the bus controller 200 continues to request data from the next incremented addresses in the type-DM region 506 until the returned patch data 120 includes a jump instruction or address that directs the bus controller 200 to request and address of the ROM region 504 of the address map 502. Such an implementation reduces the number of associative records 510 that is needed and thereby saves space and reduces the time and computing resources needed to process and apply the patch data 120.

Example Methods

FIG. 6 illustrates an example method 600 for implementing memory patching with associative and directly mapped patch data in accordance with one or more implementations of the present disclosure. The method 600 is shown as a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made only for the purpose of example. The techniques of directly mapped patch data for memory patching are not limited to performance by one entity or multiple entities operating on one device.

At block 602, a request is received from a bus controller for first data stored at a first address in a first region of an address map of a boot ROM. For example, the boot ROM controller 114 receives, from the bus controller 200 or another entity (e.g., from a boot loader via a data bus), the request for the first data stored at the first address in the first region of the address map of the boot ROM 110 (e.g., an address in the ROM region 504 of the address map 502 for a ROM record in the boot code 118). The first data may be, for example, boot instructions, boot code, boot data, hard-coded ROM contents, or a combination thereof. The bus controller 200 may have a predefined list of memory addresses within the boot ROM 110 that may be used for boot processes. For example, the bus controller 200 may send a request to the boot ROM controller 114 for the memory addresses of the boot ROM 110 in an ascending order (e.g., 0x0000_0000, 0x0000_0001, 0x0000_0002, 0x0000_00003) or another order. In some implementations, the address may also or instead be an index of the requested programmable memory address (e.g., 1, 2, 3, and so forth). The index, I, can indicate a request for patch data 120 of the $I^{th}$ indexed memory address (e.g., for I=2, the request can be for the second directly mapped record in the programmable memory 112). To implement the incrementing of addresses or indices, the boot ROM controller 114 may maintain one or more respective program counters for a current address, a last accessed address, or a last address of a request received from the bus controller 200.

At block 604, a determination is made, based on the first address, that an associative record in the programmable memory includes an address that matches the first address of the requested first data. For example, the boot ROM controller 114 may determine that an associative record 408 (or 510) in the programmable memory 112 includes an address that matches the first address requested by the bus controller 200. To make the determination, the boot ROM controller 114 may query the programmable memory 112 directly or indirectly (e.g., through the patch manager 116). The query may, for example, comprise reading, sensing, or accessing an associative address 412 of the associative record to determine whether the associative address 412 (or other information in the associative record) matches the requested address.

At block 606, patch data of the associative record is returned to the bus controller. The patch data of the associative record can include a jump instruction to a second address in a second region of the address map of the boot ROM. For example, the boot ROM controller 114 can return the patch data 120 (e.g., the requested first data, such as the data 410 of the associative record 408 or 510) to the bus controller 200. The patch data 120 of the associative record 408 may include a jump instruction to the second address in the second region of the address map of the boot ROM 110. For example, the jump instruction can be to an address in the type-DM region 506 of the address map 502. In other implementations, instead of or in addition to the jump instruction, the patch data 120 of the associative record may include instructions or data useful to replace or modify boot code stored at the first address in the boot ROM 110.

At block 608, based on the patch data of the associative record, a request is received from the bus controller for second data stored at the second address in the second region of the address map. In other words, the patch data of the associative record is useful to redirect the boot process to the type-DM region of the address map to access directly mapped patch data. As described herein, the addresses in the second or offset region of the address map can be directly mapped to records in a second region of the programmable memory. For example, the boot ROM controller 114 receives, from the bus controller 200 and based on the patch data 120 (e.g., the jump instruction), the request for the second data stored at an address in the type-DM region 506 of the address map 502. The second data may be stored in a directly mapped record 512 (or 416) at an address of the type-DM region 506 (e.g., the second data may be data 418 of the directly mapped record 512 or 416). As described, the data stored at the second address in the second region of the boot ROM address map (e.g., directly mapped records 416 or 512) is not stored in the boot ROM 110. Rather, the data is physically located in the programmable memory 112, which may be, for example, a one-time programmable (OTP) memory or a multi-time programmable (MTP) memory.

At block 610, the second data (e.g., patch data) of the directly mapped record is accessed, based on an offset between the start address of the second region of the address map and the second address. For example, the boot ROM controller 114 can access, directly or indirectly (e.g., through the patch manager 116), the second data of the directly mapped record (e.g., second data stored at the second address). This access can be implemented based on an offset between the start address of the second region of the address map 502 (e.g., the type-DM region 506) and the second address.

In aspects, the offset is based on a header record of the programmable memory 112, a quantity of associative records stored in the programmable memory, and/or the second address in the second region of the address map 502 of the boot ROM 110 (e.g., the type-DM region 506). For example, the type-H record may be the "first" record (e.g., the lowest record) in the programmable memory 112 and include a value that describes the quantity of associative records stored in the programmable memory 112 (e.g., the number of type-FA records in the programmable memory 112). Additionally, the second address (e.g., source address) can include a value that indicates a quantity or index of directly mapped records between a first directly mapped record and the directly mapped record where the second data is stored in the OTP. Thus, as described, the OTP is implemented with one type-H record, which indicates the number of type-FA records stored in the first region of the programmable memory. Additionally, the requested type-DM address indicates which type-DM record entry includes the requested patch data. For example, a source address of 0x0001_0002 indicates that the data of the third type-DM record is requested (an "02" record that is positioned third after the "00" and "01" type-DM records). Assuming that the type-H record indicates that there are fifteen type-FA records stored in the programmable memory between the header record and a start of the type-DM records, the patch manager 116 accesses the nineteenth line or row (e.g., 0x0018 from 0x0000) of the programmable memory 112 based on the total of one type-H record, fifteen type-FA records, and three type-DM records.

At block 612, the second data (e.g., patch data) of the directly mapped record is returned to the bus controller. For example, the boot ROM controller 114 can return the second data of the directly mapped record (e.g., the data 418) to the bus controller 200. In some implementations, the patch data 120 may be sent to a boot loader (e.g., via the data bus). After the bus controller 200 receives the patch data 120 from the directly mapped record 512, the bus controller 200 can continue to request data from the next incremented addresses in the type-DM region 506 until the returned patch data 120 includes a jump instruction or address that directs the bus controller 200 to request an address of the ROM region 504 of the address map 502. In other words, a last type-DM record of a sequence of type-DM records used to provide multiple lines of patch code is configured with a jump instruction and/or address to return execution or advancement of the boot process back to the first or boot ROM region of the address map.

The method(s) described generally enable patching operations with fewer type-FA records through the use of implicitly addressed type-DM records, which also occupy relatively less memory space than type-FA records. Further, because there is no address field, associative address, or address information in the type-DM records to read or evaluate, processing time and resources consumed to patch boot code can be reduced.

As other examples, consider the following described methods and apparatuses that can be implemented to provide memory patching with associative and directly mapped patch data in different scenarios. In some implementations, the patch process is an insertion of additional code into the boot code 118. As noted, this is a common mode of patching, and multiple lines of patch data can be inserted between two lines of sequentially addressed boot code. To perform the insertion, the general process is to use a type-FA record (e.g., an associative record 408 or 510) to jump from the boot code address just before the intended point of insertion to an address in the type-DM region 506 of the address map 502 (e.g., a directly mapped record 416 or 512). The bus controller 200 then requests the data from one or more of the directly mapped records starting at that address (e.g., the data 418). The last instruction in the insertion code (e.g., the last directly mapped record) includes an instruction to jump back to the boot code 118 at the boot ROM address this next after the insertion point.

In the context of an address map, consider the following example in which the patch data includes a sequence of code that is to be inserted between boot ROM address lines 14 and 15 (e.g., between 0x0000_0014 and 0x0000_0015 of the ROM address map 502). In this example, the bus controller 200 issues a request (e.g., issues a read transaction) to the boot ROM controller 114 for data stored in the boot ROM 110 at boot ROM address 0x0000_0014. The boot ROM controller 114 issues a corresponding transaction to the patch manager 116 (the boot ROM controller 114 may also access the data at the requested address to potentially fetch the boot record/data that corresponds to address 0x0000_0014). The patch manager 116 searches the type-FA records to determine whether there is a type-FA record with a match to address 0x0000_0014 (e.g., an associative address 412 that matches address 0x0000_0014). If there is a match, the patch manager 116 returns the data of the type-FA record (e.g., the data 410) to the boot ROM controller 114. In this example, assume that the data 410 includes the boot code of address 0x0000_0014 and a jump instruction into the type-DM region 506 of the address map 502 at a third line or address entry (e.g., 0x0001_0002). The boot ROM controller 114 then returns the type-FA record data to the bus controller 200 in response to the request for the data of address 0x0000_0014. Thus, instead of the boot code 118 from address 0x0000_0014 in the boot ROM 110, the boot ROM controller 114 returns the patch data 120 from the type-FA record that matches the requested address 0x0000_0014, which in this example is a jump instruction to address 0x0001_0002 as described above.

When the bus controller 200 or a boot loader receives the code of the type-FA record, the patch data 120 for address 0x0000_0014 is executed, and the jump instruction causes a program counter of the bus controller 200 to jump or point to address 0x0001_0002 of the type-DM region 506 in the address map (e.g., in the offset region of the boot ROM address map). Accordingly, the bus controller 200 issues a request for the patch data at the address 0x0001_0002 (and the boot ROM controller 114 issues a corresponding request to the patch manager 116). The patch manager 116 returns to the boot ROM controller 114 the data of the data 418 of the directly mapped record 512 that is mapped to the 0x0001_0002 address. As described above, the mapped address 0x0001_0002 corresponds to a third address (00, 01, 02) or index in the OTP memory after the header record 402 and all of the associative records 408. For example, if there are 11 associative records 408, the 02 address is mapped or indexed to the fifteenth address in the programmable memory 112 (one header record, eleven associative records, and three directly mapped records). The boot ROM controller 114 then returns to the bus controller 200 the data 418 from the programmable memory that is directly mapped to the 0x0001_0002 address in the address map. The bus controller 200 executes the data 418 (directly mapped patch data) and continues to request data from the next addresses (e.g., 0x0001_0003, 0x0001_0004, and so forth) until a directly mapped record 512 retrieved from the programmable memory includes an instruction to jump back to an address in the ROM region 504 of the address map 502. For example, assume address 0x0001_0005 includes a jump instruction back to address 0x0000_0015 of the ROM region 504 to return after the insertion of patch data is complete.

Another type of patch process is an omission of code. To perform the omission or skip of target boot code, a type-FA record (e.g., an associative record 408 or 510) is used to jump from the boot code address just before the intended point of omission to the address after the last line of omitted code. For example, consider an example in which the patch code includes a sequence of code that is intended to omit boot ROM lines 15 and 16 (e.g., 0x0000_0014 and 0x0000_0015 of the ROM address map 502). In this example, the bus controller 200 issues a request (e.g., issues a read transaction) to the boot ROM controller 114 for data stored in the boot ROM 110 at boot ROM address 0x0000_0014. The boot ROM controller 114 issues a corresponding transaction to the patch manager 116 (the boot ROM controller 114 may also access the data at the requested address to potentially fetch the boot record/data that corresponds to address 0x0000_0014). The patch manager 116 searches the type-FA records to determine whether there is a type-FA record with a match to address 0x0000_0014 (e.g., an associative address 412 that matches address 0x0000_0014). Here, the patch manager 116 returns the data of the type-FA record (e.g., the data 410), which includes only a jump instruction to address 0x0000_0016 of the ROM region 504 to omit or skip the boot code at lines 14 and 15. Thus, when the bus controller 200 requests the data for the ROM address 0x0000_0014, the patch code jump instruction skips lines 15 and 16 (e.g., the omitted or "deleted" lines), and the bus controller proceeds to request line 17 of the boot code at address 0x0000_0016.

Further, aspects described here may also be used for a code modification of the boot code 118 with type-DM records in which alternate patch code is executed instead of the boot code that is intended to be patched. For example, the patch code (e.g., the patch data 120) can be used to modify boot ROM lines 2, 3, and 4 at addresses 0x0000_0003, 0x0000_0004, 0x0000_0005 of the ROM address map 502. The general process is similar to a code insertion as described above, except the return jump is pointed to an address after the last line of modified boot code. In this example, assume that patch data 120 for the code modification is stored in directly mapped records 512 of the programmable memory that are mapped to lines 8, 9, and 10 of the type-DM region 506 of the address map 502 at addresses 0x0001_0007, 0x0001_0008, and 0x0001_0009. Thus, to implement the code modification, an associative record 510 is used to jump from boot ROM address 0x0000_0003 to an address in the offset region of the address map at 0x0001_0007 to obtain the patch data 120 from the corresponding directly mapped record of the programmable memory. The patch data from the type-DM records that directly map to addresses 0x0001_0007, 0x0001_0008, and 0x0001_0009 is returned to the bus controller 200 to be executed. The data 418 of the type-DM record mapped to address 0x0001_0009 also includes a jump instruction to address 0x0000_0007 for line 6 of the ROM region 504, the first line after the boot code that is modified with the patch data. In this way, the boot code 118 of boot ROM addresses 0x0000_0003, 0x0000_0004, 0x0000_0005 is replaced (e.g., "modified") by directly mapped records that correspond to the addresses 0x0001_0007, 0x0001_0008, and 0x0001_0009 in the DM region of the address map.

In various aspects described herein, patching may comprise various methods of insertion, deletion, modification, or otherwise changing of instructions and data stored within and/or retrieved from the boot ROM 110. Actual modification of the instructions and data stored within the boot ROM 110 may be unnecessary, as instructions and data may be supplanted or omitted by downstream controllers (e.g., bus controller 200) without changing the underlying circuitry. In such a way, instructions and data used to boot the computing device 102 and circuitry therein may be stored without modification in boot ROM 110 and securely patched with instructions and data stored within the programmable memory 112. A boot routine may be a sequence of steps that initialize an operating system, circuitry, or other functions of the computing device 102 based on the data provided.

The computer-readable medium 106 may be contiguous or non-contiguous, and the boot ROM 110, programmable memory 112, and other memory structures defined therein may be contiguous or non-contiguous. In an example, the computer-readable medium 106 may be a contiguous set of address space where the boot ROM 110 is defined by a sequential address space and the programmable memory 112 is a sequential address dependent therefrom. The terms first, second, and other numerical adjectives are intended for distinction and antecedent purposes and not ordinal purposes, and the adjectives recited herein are not intended to limit the breadth of the nouns depending therefrom.

Although implementations of techniques for, and apparatuses enabling, memory patching with associative and directly mapped patch data have been described in language specific to features and/or methods, it is to be understood that the subject of the appended claims is not necessarily limited to the specific features or methods described. Rather, the specific features and methods are disclosed as example implementations enabling directly mapped patch data for memory patching.

In the following, several examples are described:

Example 1. A method for patching a boot read-only memory, ROM, comprising: receiving, from a bus controller, a request for first data stored at a first address in a first region of an address map of the boot ROM; determining, based on the first address, that an associative record in a first region of a programmable memory includes an address that matches the first address; returning, to the bus controller, patch data of the associative record, the patch data including a jump instruction to a second address in a second region of the address map of the boot ROM; receiving, from the bus controller and based on the patch data, a request for second data stored at the second address in the second region of the address map, the addresses in the second region of the address map being directly mapped to records in a second region of the programmable memory; accessing, based on an offset between the start of the second region of the address map and the second address, the second data of a directly mapped record in the second region of the programmable memory; and returning, to the bus controller, the second data of the directly mapped record from the programmable memory.

Example 2. The method of example 1, wherein the offset is based on: a header record of the programmable memory; a quantity of associative records stored in the first region of the programmable memory; and the second address in the second region of the address map of the boot ROM.

Example 3. The method of example 2, wherein the header record of the programmable memory includes a value that describes the quantity of associative records stored in the programmable memory.

Example 4. The method of any of the preceding examples, wherein the second address indicates a value that corresponds to a quantity of directly mapped records between a first directly mapped record in the second region of the programmable memory and the directly mapped record in the programmable memory storing the second data.

Example 5. The method of any of the preceding examples, further comprising accessing third data stored at a third address in the second region of the address map of the boot ROM, the third data including another jump instruction, the other jump instruction including a fourth address in the first region of the address map.

Example 6. The method of any of the preceding examples, wherein the directly mapped records of the second region of the programmable memory: do not include an address field; or do not include information related to addresses of the second region of the address map of the boot ROM.

Example 7. The method of any of the preceding examples, wherein the boot ROM does not include data stored at the second address in the second region of the boot ROM address map.

Example 8. The method of any of the preceding examples, wherein: the request for the first data is issued by a boot loader to the bus controller, the request is received via a data bus, the request is a request for boot code, and the method further comprises: sending, via the data bus, the second data as patch data to the boot loader as a response to the request for the first data.

Example 9. The method of any of the preceding examples, wherein the programmable memory is implemented as one of: a one-time programmable, OTP, memory; or a multi-time programmable, MTP, memory.

Example 10. The method of any of the preceding examples, wherein: the request for first data stored is a request for boot code stored in the boot ROM; and the second data comprises patch data that includes one of: instructions to execute before boot code stored in the boot ROM that corresponds to one or more other addresses in the address map after the first address; or instructions to execute in place of boot code stored in the boot ROM that corresponds to one or more other addresses in the address map after the first address.

Example 11. A computer-readable storage medium comprising computer-executable instructions that when executed by a computer will cause the computer to carry out a method according to any one of the preceding examples.

Example 12. An apparatus, comprising: a boot read-only memory, ROM; a programmable memory; a patch manager; and a ROM controller configured to: receive, from a bus controller, a request for first data stored at a first address in a first region of an address map of the boot ROM; return to the bus controller, based on a determination by the patch manager that an associative record in a first region of a programmable memory includes an address that matches the first address, patch data of the associative record, the patch data including a jump instruction to a second address in a second region of the address map of the boot ROM; receive, from the bus controller and based on the patch data, a request for second data stored at the second address in the second region of the address map, the addresses in the second region of the address map being directly mapped to records in a second region of the programmable memory; receive, from the patch manager, the second data from a directly mapped record in the second region of the programmable memory, the patch manager configured to access the directly mapped records in the second region of the programmable memory based on an offset between the start of the second region of the address map and the second address; and return, to the bus controller, the second data of the directly mapped record in the second region of the programmable memory.

Example 13. The apparatus of example 12, wherein the directly mapped records of the programmable memory: do not include an address field; or do not include information related to addresses of the second region of the address map of the boot ROM.

Example 14. The apparatus of any of the preceding examples, wherein: addresses in the second region of the address map of the boot ROM are offset from addresses in the first address region of the address map of the boot ROM; and the boot ROM does not include rows or lines of boot code that map to the addresses in the second region of the boot ROM address map.

Example 15. The apparatus of any of the preceding examples, wherein the ROM controller is further configured to: receive, via a data bus, the request for the first data stored at the first address in the first region of the address map of the boot ROM as a request for boot code from a boot loader; and return, via the data bus, the patch data to the boot loader as a response to the request for the first data.

Example 16. The apparatus of any of the preceding examples, wherein the programmable memory is implemented as one of: a one-time programmable, OTP, memory; or a multi-time programmable, MTP, memory.

What is claimed is:

1. A method for patching a boot read-only memory, ROM, comprising:

receiving, from a bus controller, a request for first data stored at a first address in a first portion of an address map of the boot ROM;

determining, based on the first address, that an associative record in a first region of a one-time programmable, OTP, memory includes an address that matches the first address;

returning, to the bus controller, patch data of the associative record, the patch data including a jump instruction to a second address in a second portion of the address map of the boot ROM, the second portion of the address map being distinct from the first portion of the address map;

receiving, from the bus controller and based on the patch data, a request for second data stored at the second address in the second portion of the address map, the addresses in the second portion of the address map being directly mapped to records in a second region of the OTP memory;

accessing, based on an offset between the start of the second portion of the address map and the second address, the second data of a directly mapped record in the second region of the OTP memory, the offset based on a header record of the OTP memory that stores a value describing a quantity of associative records in the first region of the OTP memory; and returning, to the bus controller, the second data of the directly mapped record from the OTP memory.

2. The method of claim 1, wherein the offset is further based on:

a quantity of associative records stored in the first region of the OTP memory; and the second address in the second portion of the address map of the boot ROM.

3. The method of claim 2, wherein the header record of the OTP memory includes a value that describes the quantity of associative records stored in the programmable memory.

4. The method of claim 1, wherein the second address indicates a value that corresponds to a quantity of directly mapped records between a first directly mapped record in the second region of the OTP memory and the directly mapped record in the OTP memory storing the second data.

5. The method of claim 1, wherein the directly mapped records of the second portion region of the OTP memory:

do not include an address field; or do not include information related to addresses of the second portion of the address map of the boot ROM.

6. The method of claim 1, wherein the boot ROM does not include data stored at the second address in the second portion of the boot ROM address map.

7. The method of claim 1, wherein:

the request for the first data is issued by a boot loader to the bus controller, the request is received via a data bus, the request is a request for boot code, and the method further comprises:

sending, via the data bus, the second data as patch data to the boot loader as a response to the request for the first data.

8. The method of claim 1, wherein:

the request for first data stored is a request for boot code stored in the boot ROM; and the second data comprises patch data that includes one of:

instructions to execute before boot code stored in the boot ROM that corresponds to one or more other addresses in the address map after the first address; or instructions to execute in place of boot code stored in the boot ROM that corresponds to one or more other addresses in the address map after the first address.

9. The method of claim 1, wherein the records in the second region of the OTP memory are in a same region, the method further comprising:

setting a remaining space in the second region of the OTP memory to a locked state, wherein the remaining space is unavailable for further modification; and locking the second region portion of the OTP memory with one or more of a lock bit or a security register setting.

10. The method of claim 1, wherein the returning, to the bus controller, of the second data of the directly mapped record in the second region of the OTP memory comprises:

determining, by an OTP controller, one or more lines of the second data to be returned; and returning, by the OTP controller, the one or more lines of the second data to the bus controller.

11. The method of claim 1, wherein the directly mapped records do not comprise an associative address field.

12. An apparatus, comprising:

a boot read-only memory, ROM;

a one-time programmable, OTP, memory;

a patch manager; and a ROM controller configured to:

receive, from a bus controller, a request for first data stored at a first address in a first portion of an address map of the boot ROM;

return to the bus controller, based on a determination by the patch manager that an associative record in a first region of the OTP memory includes an address that matches the first address, patch data of the associative record, the patch data including a jump instruction to a second address in a second portion of the address map of the boot ROM, the second portion of the address map being distinct from the first portion of the address map;

receive, from the bus controller and based on the patch data, a request for second data stored at the second address in the second portion of the address map, the addresses in the second portion of the address map being directly mapped to records in a second region of the OTP memory;

receive, from the patch manager, the second data from a directly mapped record in the second region of the OTP memory, the patch manager configured to access the directly mapped records in the second region of the OTP memory based on an offset between the start of the second portion of the address map and the second address, the offset based on a header record of the OTP memory that stores a value describing a quantity of associative records in the first region of the OTP memory; and return, to the bus controller, the second data of the directly mapped record in the second region of the OTP memory.

13. The apparatus of claim 12, wherein the directly mapped records of the OTP memory:

do not include an address field; or do not include information related to addresses of the second portion of the address map of the boot ROM.

14. The apparatus of claim 12, wherein:

addresses in the second portion of the address map of the boot ROM are offset from addresses in the first portion of the address map of the boot ROM; and the boot ROM does not include rows or lines of boot code that map to the addresses in the second portion of the boot ROM address map.

15. The apparatus of claim 12, wherein the ROM controller is further configured to:

receive, via a data bus, the request for the first data stored at the first address in the first portion of the address map of the boot ROM as a request for boot code from a boot loader; and return, via the data bus, the patch data to the boot loader as a response to the request for the first data.

16. A non-transitory computer readable storage medium comprising computer-executable instructions that when executed by a computer will cause the computer to: receive, from a bus controller, a request for first data stored at a first address in a first portion of an address map of a boot ROM; determine, based on the first address, that an associative record in a first region of a one-time programmable, OTP, memory includes an address that matches the first address; return, to the bus controller, patch data of the associative record, the patch data including a jump instruction to a second address in a second portion of the address map of the boot ROM, the second portion of the address map being distinct from the first portion of the address map; receive, from the bus controller and based on the patch data, a request for second data stored at the second address in the second portion of the address map, the addresses in the second portion of the address map being directly mapped to records in a second region of the OTP memory; access, based on an offset between the start of the second portion of the address map and the second address, the second data of a directly mapped record in the second region of the OTP memory, the offset based on a header record of the OTP memory that stores a value describing a quantity of associative records in the first region of the OTP memory; and return, to the bus controller, the second data of the directly mapped record from the OTP memory.

17. The non-transitory computer readable storage medium of claim 16, wherein the offset is based on: a quantity of associative records stored in the first region of the OTP memory; and the second address in the second portion of the address map of the boot ROM.

18. The non-transitory computer readable storage medium of claim 17, wherein the header record of the OTP memory includes a value that describes the quantity of associative records stored in the OTP memory.

19. The non-transitory computer readable storage medium of claim 16, wherein the second address indicates a value that corresponds to a quantity of directly mapped records between a first directly mapped record in the second region of the OTP memory and the directly mapped record in the OTP memory storing the second data.

20. The non-transitory computer readable storage medium of claim 16, wherein the computer-executable instructions further cause the computer to access third data stored at a third address in the second portion of the address map of the boot ROM, the third data including another jump instruction, the other jump instruction including a fourth address in the first portion of the address map.

\* \* \* \* \*